United States Patent
Araki et al.

(10) Patent No.: US 12,187,401 B2
(45) Date of Patent: Jan. 7, 2025

(54) SMALL PLANING WATERCRAFT

(71) Applicant: Kawasaki Jukogyo Kabushiki Kaisha, Kobe (JP)

(72) Inventors: Toshio Araki, Kobe (JP); Yuu Shibuta, Akashi (JP); Marika Satake, Akashi (JP)

(73) Assignee: Kawasaki Motors, Ltd., Hyogo (JP)

( * ) Notice: Subject to any disclaimer, the term of this patent is extended or adjusted under 35 U.S.C. 154(b) by 581 days.

(21) Appl. No.: 17/448,930

(22) Filed: Sep. 27, 2021

(65) Prior Publication Data

US 2023/0098177 A1    Mar. 30, 2023

(51) Int. Cl.
*B63H 25/02* (2006.01)
*B62J 11/00* (2020.01)
*B63B 34/10* (2020.01)

(52) U.S. Cl.
CPC .............. *B63H 25/02* (2013.01); *B62J 11/00* (2013.01); *B63B 34/10* (2020.02); *B63H 2025/024* (2013.01)

(58) Field of Classification Search
CPC ........ B63H 25/00; B63H 25/02; B63B 34/00; B63B 34/10; B60R 9/00; B62J 11/00; B62J 11/02; B62J 11/04
USPC .......................................................... 114/55.5
See application file for complete search history.

(56) References Cited

U.S. PATENT DOCUMENTS

| | | | |
|---|---|---|---|
| 6,125,782 A * | 10/2000 | Takashima | B63B 49/00 114/55.57 |
| 7,026,912 B2 * | 4/2006 | Suzuki | B63J 99/00 440/1 |
| 9,139,246 B2 * | 9/2015 | Oquendo | B62J 11/00 |
| 10,611,438 B1 | 4/2020 | Araki et al. | |

* cited by examiner

*Primary Examiner* — Lars A Olson
(74) *Attorney, Agent, or Firm* — BURR PATENT LAW, PLLC

(57) ABSTRACT

A small planing watercraft includes: a body; a seat located above the body; a steering handle located above the body and forward of the seat; and an additional part holding mount secured to the handle and disposed forward of a rear surface of the handle.

19 Claims, 7 Drawing Sheets

SMALL PLANING WATERCRAFT

BACKGROUND OF THE INVENTION

Field of the Invention

The present disclosure relates to small planing watercrafts.

Description of the Background Art

U.S. Pat. No. 10,611,438 discloses a small planing watercraft including a handlebar covered with a resin. The small planing watercraft has a hole for holding a drink bottle in a deck.

SUMMARY

A small planing watercraft according to one aspect includes: a body; a seat located above the body; a steering handle located above the body and forward of the seat; and an additional part holding mount secured to the handle and disposed forward of a rear surface of the handle.

According to the small planing watercraft, an additional part attached to the mount is disposed near the handle. The additional part can be disposed closer to an operator compared with a case where the mount is provided to the deck. The additional part is angularly displaced together with the handle, so that the additional part can be disposed in a position responsive to a heading direction of the body. The additional part is disposed forward of the handle, so that contact of the operator with the additional part can be prevented, and reduction in steering operability can be suppressed when the operator performs steering operation.

A small planing watercraft according to another aspect includes: a body; a seat located above the body; a handle including a first handle grip located to the left of a center in a left-right direction of the body and a second handle grip located to the right of the center in the left-right direction of the body, and located above the body and forward of the seat; and a rod supported by the handle, and located forward of the first handle grip and the second handle grip.

According to the small planing watercraft, the additional part attached to the rod is disposed near the handle. The additional part can be disposed closer to the operator compared with a case where the rod is provided to the deck. The additional part is angularly displaced together with the handle, so that the additional part can be disposed in the position responsive to the heading direction of the body. The additional part is disposed forward of the handle, so that contact of the operator with the additional part can be prevented, and reduction in steering operability can be suppressed when the operator performs steering operation.

A small planing watercraft according to yet another aspect includes: a body; a seat located above the body; a steering handle located above the body and forward of the seat, and including a pair of handle grips to be grasped by an operator at opposite longitudinal ends thereof, a handlebar supporting the pair of handle grips, and a cushion covering at least portion of the handlebar from behind; and a key insertion opening disposed forward of a rear end of the cushion.

According to the small planing watercraft, a key inserted into the key insertion opening is likely to be protected by the cushion.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments

A small planing watercraft according to an embodiment will be described below.

Overall Configuration

Figure 1:
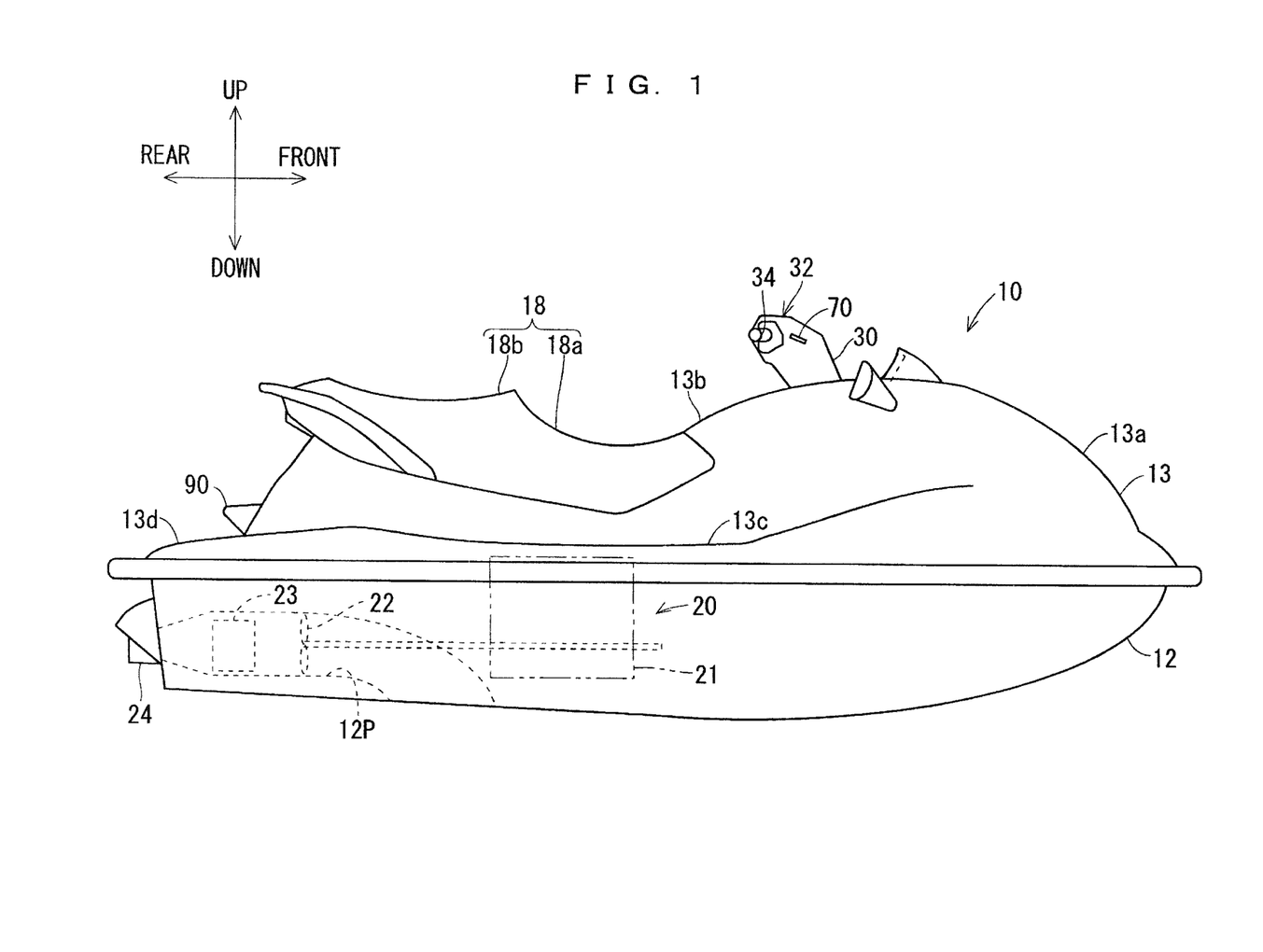
FIG. 1 is a side view illustrating a small planing watercraft 10.

An overall configuration of the small planing watercraft will be described. FIG. 1 is a side view illustrating a small planing watercraft 10. The small planing watercraft 10 is a boat raised by lift when moving forward, and planing to slide across a water surface. The small planing watercraft 10 may have a size for a single person, two to four people, or five or more people, for example. One example of the small planing watercraft 10 is a personal watercraft (PWC). The small planing watercraft 10 may be a motorboat. An example in which the small planing watercraft 10 is the PWC will be described in the present embodiment.

The small planing watercraft 10 includes a body 12, a deck 13, a seat 18, a handle 32, and mounts 70. The body 12 is a structure of the small planing watercraft 10 having a space to generate buoyancy in water. For example, the body 12 is a container-like structure closing on a lower side and opening on an upper side. The deck 13 covers an opening on the upper side of the body 12. The seat 18 is disposed on the deck 13. People on board are seated on the seat 18. The handle 32 is disposed above the body 12 and forward of the seat 18. From among the people on board, an operator operates the handle 32 in a state of being seated on the seat 18. With reference to a position of the operator operating the small planing watercraft 10 in a planing state, a side forward of the operator is a front side, and a side rearward of the operator is a rear side. A left side and a right side are determined with reference to a state of the operator facing forward. A left-right direction of the body 12 is a direction of the width of the body 12. A side of the body 12 is a lower side, and a side of the deck 13 is an upper side.

The deck 13 includes a front 13a, a central protrusion 13b, side floors 13c, and a rear floor 13d. The front 13a covers a front portion of the opening on the upper side of the body 12. The front 13a is curved to be convex. A rear end of the front 13a is located above a front end of the front 13a, and the center along the width of the front 13a is located above opposite ends along the width of the front 13a. The central protrusion 13b extends rearward from the center along the width of the rear end of the front 13a. The central protrusion 13b has a smaller width than the deck 13. The side floors 13c extend outward along the width of the central protrusion 13b. A rear end of the central protrusion 13b is located forward of a rear end of the deck 13. The rear floor 13d extends behind the central protrusion 13b of the deck 13. The central protrusion 13b protrudes above the side floors 13c and the rear floor 13d.

The seat 18 is located above the body 12, and is supported by an upper portion of the central protrusion 13b. People on board are seated on the seat 18 to straddle the seat 18. The seat 18 is longer in a fore-aft direction, for example. The seat 18 includes a seat front portion 18a and a seat rear portion 18b located rearward of the seat front portion 18a, for example. The seat front portion 18a is lower than the seat rear portion 18b. From among the people on board, the operator is seated on the seat front portion 18a, and a passenger is seated on the seat rear portion 18b.

The small planing watercraft 10 includes a propulsion device 20. The propulsion device 20 is a device for propelling the small planing watercraft 10. The propulsion device 20 includes a travel drive source 21, an impeller 22, a stator vane 23, and a nozzle 24, for example.

The travel drive source 21 rotationally drives the impeller 22. The travel drive source 21 is only required to generate propulsion for the small planing watercraft 10. For example, the travel drive source 21 may be an internal combustion engine to generate rotary drive force through fuel combustion or an electrical motor to generate the rotary drive force using electrical energy. The travel drive source 21 is disposed within the body 12, for example. The body 12 has a water flow path 12P for taking in water outside the body 12 and jetting water rearward. The impeller 22 is disposed within the flow path 12P. The travel drive source 21 rotationally drives the impeller 22 to allow water within the flow path 12P to flow rearward of the impeller 22. The stator vane 23 is disposed rearward of the impeller 22 within the flow path 12P. A swirling flow behind the impeller 22 is rectified by the stator vane 23, and is allowed to flow further rearward. The nozzle 24 is disposed at a rear end of the flow path 12P. Water flowing from the impeller 22 through the stator vane 23 is compressed by the nozzle 24, and jetted rearward of the body 12. Propulsion for the small planing watercraft 10 can thus be obtained.

The propulsion device of the small planing watercraft 10 is not limited to that in the above-mentioned example. The small planing watercraft 10 may be propelled by rotating a screw outside the body 12, for example.

The handle 32 is a steering handle, and is located above the body 12 and forward of the seat 18. For example, the small planing watercraft 10 includes a support 30 protruding upward from the deck 13 at a location forward of the seat 18. The handle 32 is supported by an upper portion of the support 30 to be located forward of the seat 18. The operator steers the small planing watercraft 10 left and right by operating the handle 32. For example, when the handle 32 is operated, the nozzle 24 is turned to the left and right, and thus the small planing watercraft 10 is turned to the left and right.

The mounts 70 are each a portion for holding an additional part. The mounts 70 are secured to the handle 32, and disposed forward of a rear surface of the handle 32. The additional part is a part to be added separately from parts for travel. Examples of the additional part include an equipment holder for holding a smartphone, a camera, a display device, or electronic equipment and a drink holder for holding a beverage container.

Handle

Figure 2:
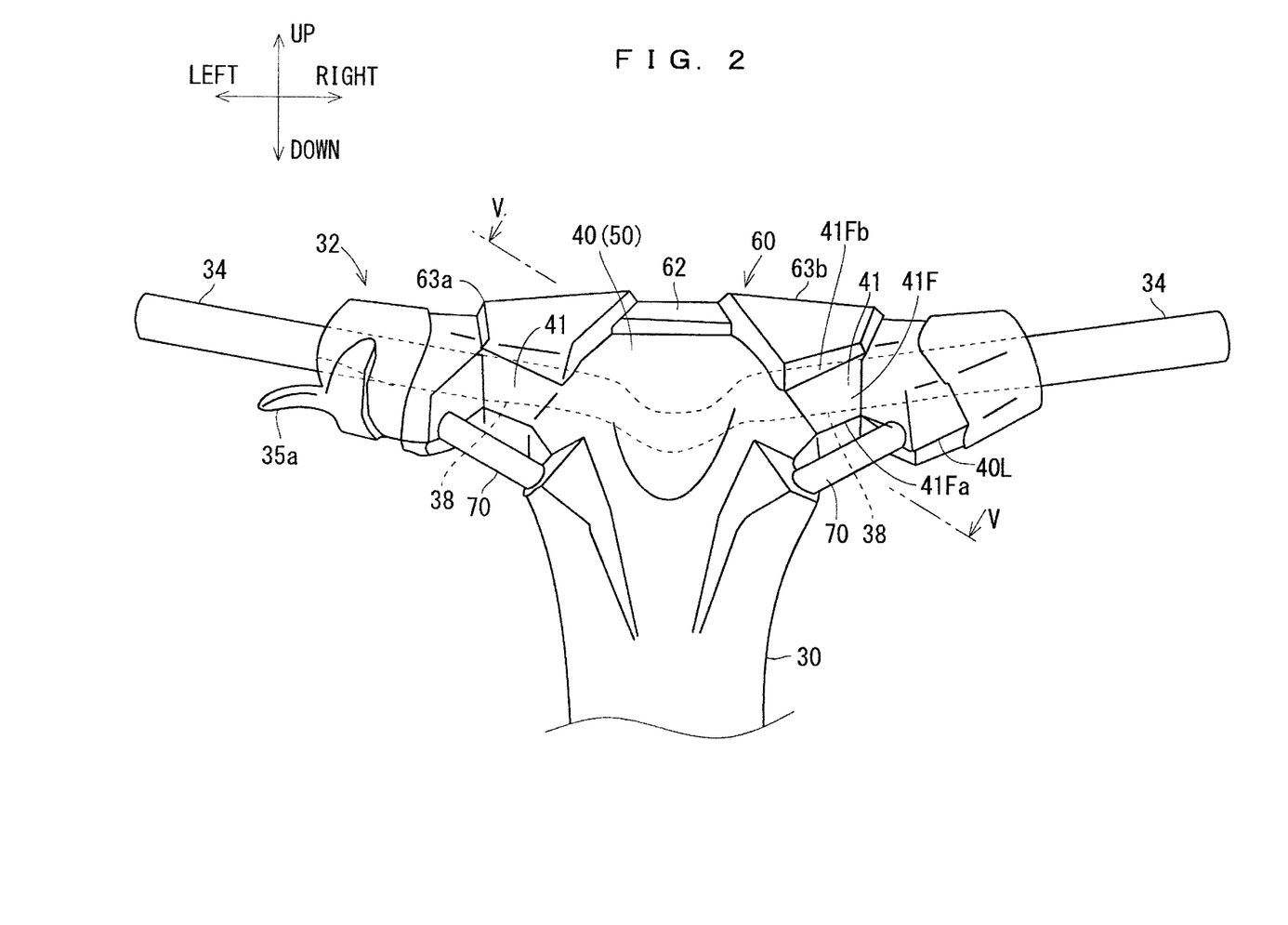
FIG. 2 is a front view of a handle.
Figure 3:
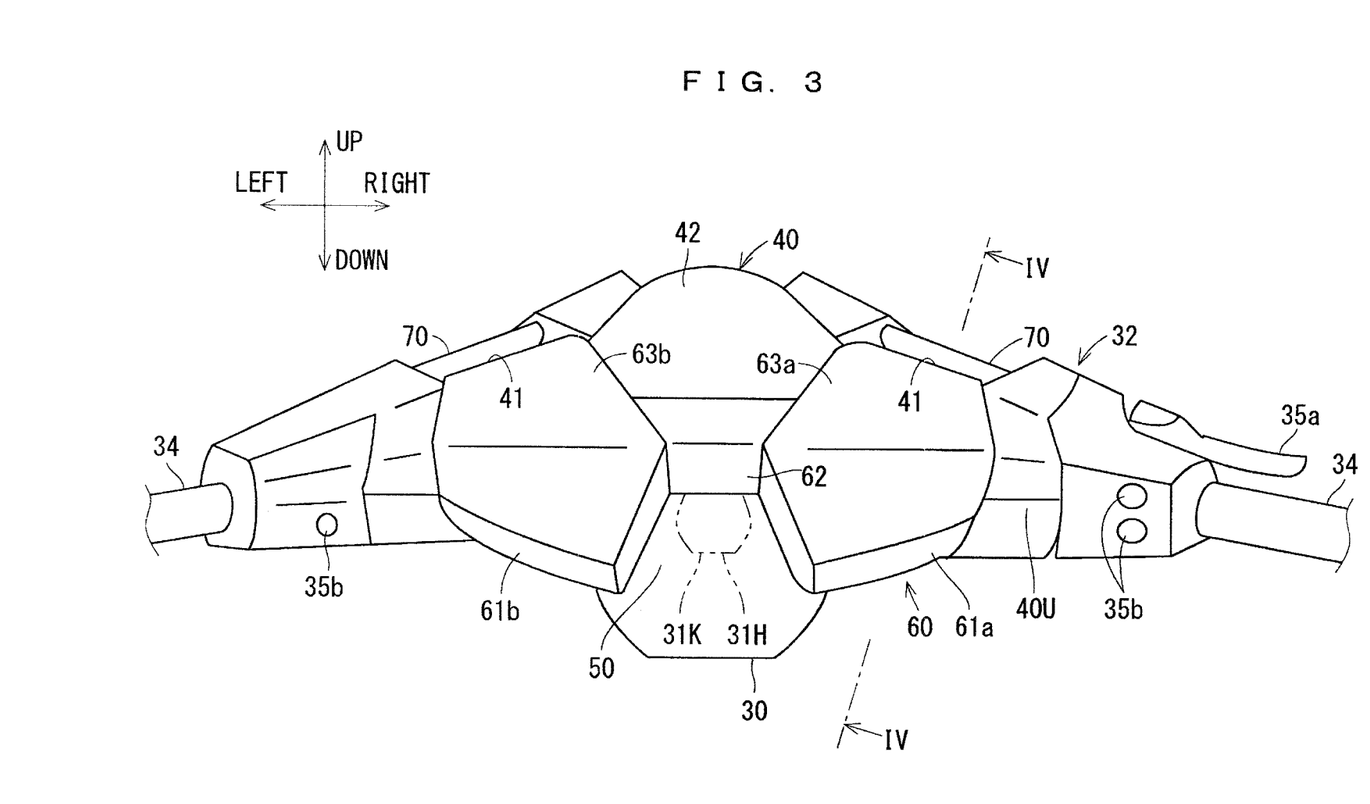
FIG. 3 is a plan view of the handle.
Figure 4:
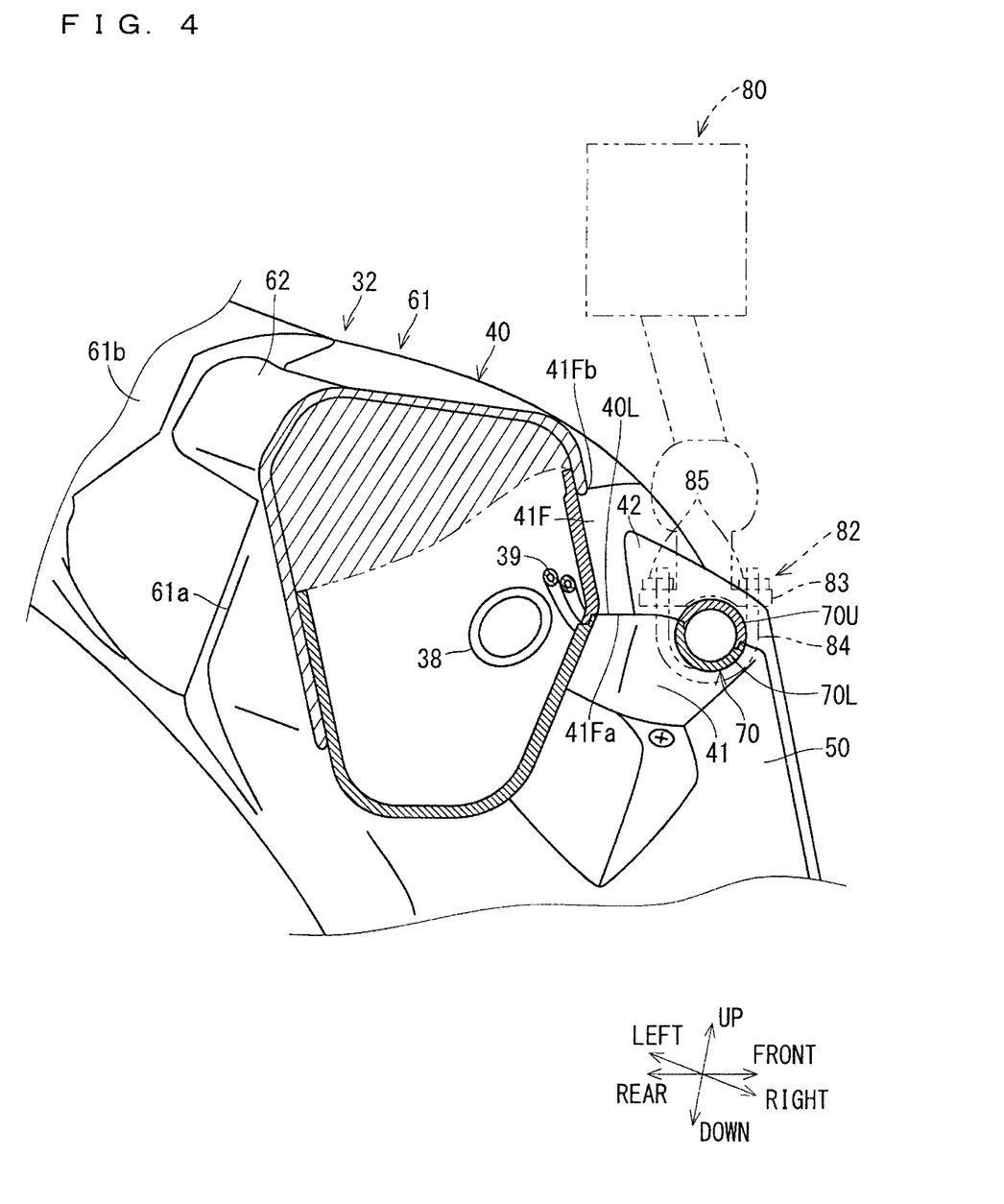
FIG. 4 is a cross-sectional view along IV-IV of FIG. 3.
Figure 5:
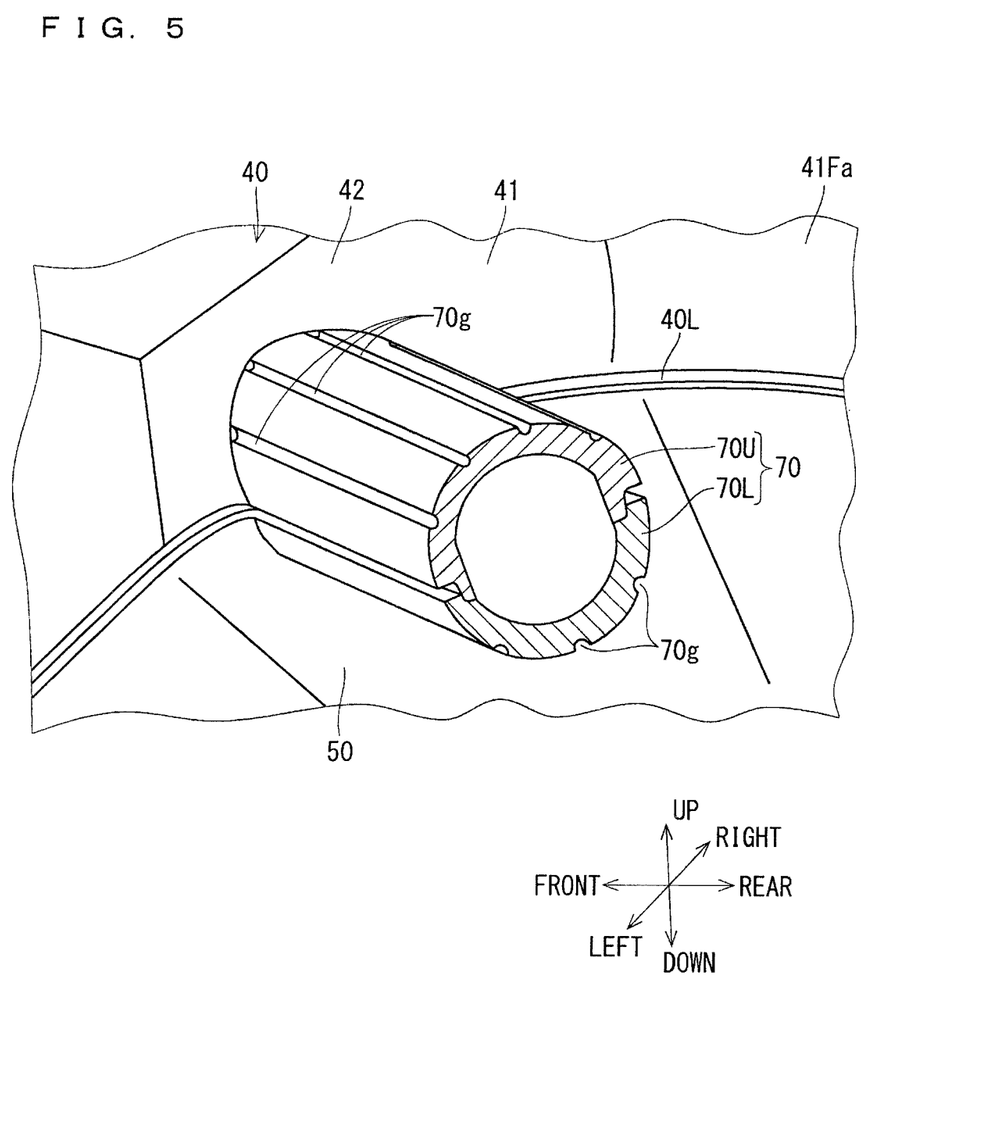
FIG. 5 is a cross-sectional view along V-V of FIG. 2.
Figure 6:
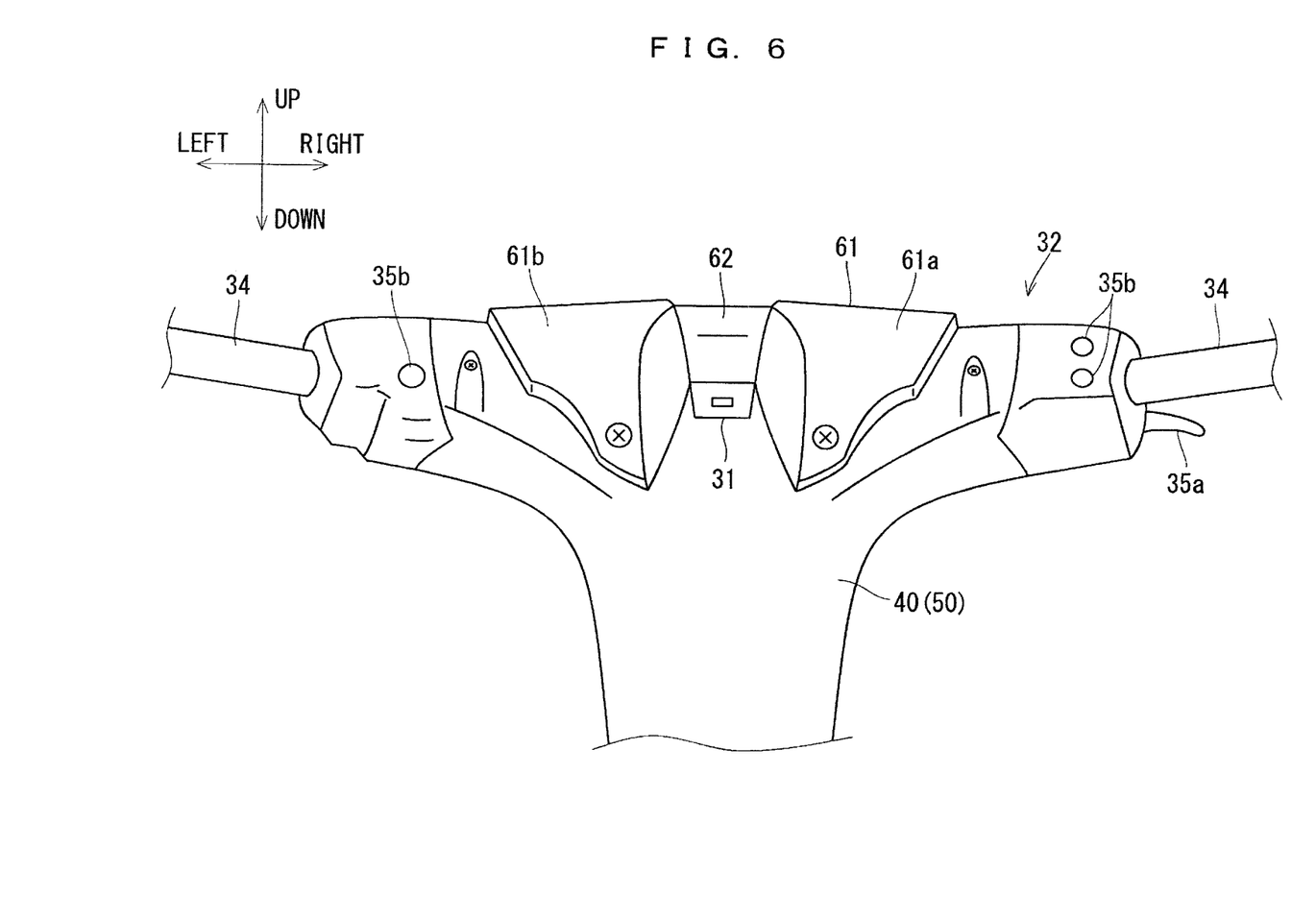
FIG. 6 is a rear view of the handle.

An example of an overall configuration of the handle 32 will be described. FIG. 2 is a front view of the handle 32. FIG. 3 is a plan view of the handle 32. FIG. 4 is a cross-sectional view along IV-IV of FIG. 3. FIG. 5 is a cross-sectional view along V-V of FIG. 2. FIG. 6 is a rear view of the handle 32.

The handle 32 as a whole is longer along the width of the body 12. The length of the handle 32 is along the width of the body 12 with an orientation of the handle 32 being set so that the small planing watercraft 10 travels straight. The handle 32 includes a pair of handle grips 34, a handlebar 38, and a handle cover 40.

The handle grips 34 are grips to be grasped by the operator. The handle grips 34 are in the form of elongated rods, for example. The handle 32 includes the pair of handle grips 34 at opposite longitudinal ends thereof. The handle grips 34 may be inclined with respect to the width of the vehicle, or may be parallel to the width of the vehicle. For example, the handle grips 34 may be inclined with respect the width of the body 12 so that inner ends of the handle grips 34 are located forward of outer ends of the handle grips 34. For example, the handle grips 34 may be inclined with respect the width of the body 12 so that the inner ends of the handle grips 34 are located below the outer ends of the handle grips 34. The operator grasps the pair of handle grips 34 with his/her left and right hands, and rotates the handle 32 around an axis of the support 30. A handle grip 34 located to the left of the center in the left-right direction of the body 12 may be referred to as a first handle grip, and a handle grip 34 located to the right of the center in the left-right direction of the body 12 may be referred to as a second handle grip. A portion to be grasped by the operator is not limited to the pair of handle grips 34. The portion to be grasped by the operator may be a ring-shaped steering wheel.

One of the handle grips 34 may be provided with a throttle lever 35a to adjust output of the travel drive source 21. One or both of the handle grips 34 may be provided with various switches 35b for operation of the small planing watercraft 10.

The handlebar 38 is contiguous with the pair of handle grips 34, and extends from the respective handle grips 34 toward the center along the width of the body 12. The handlebar 38 is a pipe formed of metal, for example. The handle grips 34 are supported by opposite ends of the handlebar 38. Portions of the handlebars 38 extending from the respective handle grips 34 toward the center along the width of the body 12 extend in the same direction as the handle grips 34. In this example, the portions of the handlebars 38 extending from the respective handle grips 34 toward the center along the width of the body 12 are inclined with respect to the width of the body 12 so that outer ends are located rearward of and above inner ends.

The portions extending from the respective handle grips 34 toward the center along the width of the body 12 may be contiguous with each other at the center along the width of the body 12, or may be separated at the center along the width of the body 12. In this example, the portions extending from the respective handle grips 34 toward the center along the width of the body 12 are contiguous with each other at the center along the width of the body 12. The center of the handlebar 38 is supported by a support rod within the support 30. The handlebar 38 is thus operably supported around the support 30. In a case where the portions extending from the respective handle grips 34 toward the center along the width of the body 12 are separated at the center along the width of the body 12, the portions of the handlebars may each be supported by the support rod within the support.

The handle cover 40 covers at least portion of the handlebar 38 from in front. In this example, the handle cover 40 includes an upper cover 42 and a lower cover 50.

The upper cover 42 covers at least portion of the handlebar 38 from above. In this example, the upper cover 42 covers at least portion of the handlebar 38 from above and from in front. More specifically, the upper cover 42 covers the opposite ends and the center of the handlebar 38 from above. Furthermore, the upper cover 42 covers the handlebar 38 over the length thereof from in front.

The lower cover 50 covers at least portion of the handlebar 38 from below. In this example, the lower cover 50 covers at least portion of the handlebar 38 from below and from behind. More specifically, the lower cover 50 covers the handlebar 38 over the length thereof from below. The lower cover 50 covers the opposite ends and the center of the handlebar 38 from behind.

The upper cover 42 and the lower cover 50 are joined together along an upper boundary 40U (see FIG. 3) and a lower boundary 40L (see FIG. 2). The upper boundary 40U extends along the width of the body 12 between an upper portion and a rear portion of the handle cover 40. The lower boundary 40L extends to divide a portion of the handle cover 40 located forward of the handlebar 38 into upper and lower portions. The lower boundary 40L may be located on a plane along the length of the handle 32. The upper cover 42 and the lower cover 50 may be joined together by directly or indirectly screwing the upper cover 42 and the lower cover 50 to the handlebar 38 or the support rod, or by screwing the upper cover 42 and the lower cover 50 to each other.

In this example, a portion of the support 30 serving as the exterior thereof is integrally formed with the center along the width of the upper cover 42 and the center along the width of the lower cover 50. The portion of the support 30 serving as the exterior thereof may not necessarily be integrally formed with the upper cover 42 and the lower cover 50.

The small planing watercraft 10 may not necessarily include the handle cover 40. The handle cover 40 may not necessarily be divided into the upper cover 42 and the lower cover 50. The handle cover as a whole may be configured by a single member, or may be configured by a combination of three or more covers.

In this example, the handle 32 includes a cushion 60. The cushion 60 is softer than the handle cover 40. For example, the handle cover 40 is formed of a solid resin, and the interior of the cushion 60 is formed of a foam resin. The cushion 60 covers at least portion of the handlebar 38 from behind. In this example, the cushion 60 includes a first rear cushion 61*a* and a second rear cushion 61*b*. The first rear cushion 61*a* covers a right portion of the handlebar 38 along the width of the body 12 from behind. The second rear cushion 61*b* covers a left portion of the handlebar 38 along the width of the body 12 from behind. The first rear cushion 61*a* and the second rear cushion 61*b* protrude rearward of a rear surface of the lower cover 50. The first rear cushion 61*a* and the second rear cushion 61*b* are separated from each other along the width of the body 12. In this example, the first rear cushion 61*a* and the second rear cushion 61*b* have inner opposing surfaces facing the center along the width of the body 12. An inner opposing surface of the first rear cushion 61*a* and an inner opposing surface of the second rear cushion 61*b* oppose to be spaced from each other at the center along the width of the body 12. The handle 32 includes a key insertion opening 31 (see FIG. 6) located between the first rear cushion 61*a* and the second rear cushion 61*b*. The key insertion opening 31 is disposed forward of rear ends of the first rear cushion 61*a* and the second rear cushion 61*b* as a rear end of the cushion 60. Insertion of a key 31K into the key insertion opening 31 (see FIGS. 3 and 6) allows for travel of the small planing watercraft 10. For example, insertion of the key 31K into the key insertion opening 31 allows for start of the travel drive source 21 of the small planing watercraft 10.

A head 31H of the key 31K protrudes rearward from the key insertion opening 31 with the key 31K being inserted into the key insertion opening 31. The head 31H is a portion of the key 31K to be held when the key 31K is inserted and removed. The first rear cushion 61*a* and the second rear cushion 61*b* may protrude rearward of the head 31H of the key 31K. The key insertion opening 31 and the head 31H of the key 31K are thus protected.

The cushion 60 includes an overhang 62 located above the key insertion opening 31 between the first rear cushion 61*a* and the second rear cushion 61*b*. The overhang 62 is contiguous with the first rear cushion 61*a* and the second rear cushion 61*b*. The overhang 62 protrudes rearward of the key insertion opening 31. The first rear cushion 61*a* and the second rear cushion 61*b* may protrude rearward of the overhang 62. The overhang 62 covers at least portion of a space between the first rear cushion 61*a* and the second rear cushion 61*b* from above. The key insertion opening 31 and the key 31K are protected by the overhang 62.

The cushion 60 includes a first front cushion 63*a* and a second front cushion 63*b*. The first front cushion 63*a* is located in a region extending above the handlebar 38 from the first rear cushion 61*a* to a front side of the handlebar 38. The second front cushion 63*b* is located in a region extending above the handlebar 38 from the second rear cushion 61*b* to the front side of the handlebar 38. The first front cushion 63*a* and the second front cushion 63*b* protrude above or forward of the upper cover 42.

The cushion 60 may overlap the handle cover 40, may partially overlap the handle cover 40, or may not overlap the handle cover 40. For example, the handle cover 40 may extend at an edge of a region of the handle 32 where the above-mentioned cushion 60 is provided, and an outer peripheral edge of the cushion 60 may overlap the handle cover 40. The cushion 60 may be attached to the handle cover 40 by a screwing or fitting structure.

Mount

As illustrated in FIGS. 1 to 5, the mounts 70 are disposed forward of the rear surface of the handle 32. In this example, the rear surface of the handle 32 is a rearward facing surface of a rear end portion of the cushion 60, and the mounts 70 are located forward of the rearward facing surface.

In this example, the mounts 70 are disposed to be spaced forward from a front surface of the handle 32. The front surface of the handle 32 includes surfaces of the handle cover 40 or the cushion 60 of the handle 32 in regions rearward of the mounts 70. In this example, the handle cover 40 has a pair of mount recesses 41 located forward of the handlebar 38 and to be separated toward the center along the width of the body 12 from the pair of handle grips 34. The mount recesses 41 are each a recess surrounded by a forward facing surface 41F facing forward, an outward facing surface facing outward along the width of the body 12, and an inward facing surface facing inward along the width of the body 12. The mount recesses 41 are each a recess opening forward, upward, and downward. Forward facing surfaces of the mount recesses 41 are front surfaces of the handle 32 opposing the mounts 70, and the mounts 70 are disposed to be spaced forward from the forward facing surfaces.

Forward facing surfaces 41F of the mount recesses 41 are one example of opposing portions opposing the mounts 70 behind the mounts 70, and extending upward from behind the mounts 70. The forward facing surfaces 41F each include a portion 41F*a* located rearward of a mount 70 and an upper edge 41F*b* of the forward facing surface 41F (see FIG. 4). The upper edge 41F*b* is located rearward of the portion 41F*a* in the fore-aft direction of the body 12. Even if the additional part attached to the mount 70 is in a position inclined rearward, the additional part is less likely to interfere with the forward facing surface 41F. Since the portion 41F*a* of the handle cover 40 opposing the mount 70 is located forward of the upper edge 41F*b*, a space is likely to be secured between the handlebar 38 and the handle cover 40. Various parts, such as a wire harness 39 (see FIG. 4) as an electrical wiring member, can be disposed in the space to extend along the handlebar 38.

The first front cushion 63*a* or the second front cushion 63*b* is disposed above the upper edge 41F*b* of the forward facing surface 41F. Even if the additional part attached to the mount 70 is inclined rearward, and comes into contact with the handle 32, the additional part is likely to he in contact with the cushion 60 softer than the handle cover 40. The additional part is thus less likely to be subjected to impact due to contact between the additional part and the handle 32.

More specifically, the mounts 70 are elongated, and rod-shaped, for example. The mounts 70 may be hollow or solid. In this example, the mounts 70 are in the form of hollow pipes. A first support end at one longitudinal end of each of the mounts 70 is supported by the above-mentioned outward facing surface, and a second support end at the other longitudinal end of the mount 70 is supported by the above-mentioned inward facing surface. The mount 70 is thus supported by the handle cover 40. The first support end and the second support end are located to be separated forward from the forward facing surface. A portion of the mount 70 between the first support end and the second support end is thus separated forward from the above-mentioned forward facing surface of the handlebar 38.

The mount recesses 41 are located to be separated inward, along the width of the body 12, of the inner ends of the handle grips 34. The mounts 70 supported in the mount recesses 41 are disposed inward, along the width of the body 12, of the inner ends of the handle grips 34 along the width of the body 12. The additional part attached to each of the mounts 70 can thus be disposed closer to the operator without overlaying the handle cover 40. The mounts 70 are disposed on a left side and a right side, so that the additional part is attached to each of the mounts 70 on the left side and the right side.

The mounts 70 may be elongated along the width of the body 12. The mounts 70 elongated along the width of the body 12 are herein not required to be the mounts 70 elongated precisely parallel to the width of the body 12. For example, in a case where an orientation of the mounts 70 is closer to a direction of the width of the body 12 than the fore-aft direction or the vertical direction of the body 12, such as a case where the mounts 70 form an angle of less than 45° with respect to the width of the body 12, it can be said that the mounts 70 are elongated along the width of the body 12. The mounts 70 may form an angle of less than 30° with respect to the width of the body 12, or may form an angle of less than 15° with respect to the width of the body 12.

In this example, outward facing surfaces of the mount recesses 41 are located forward of inward facing surfaces of the mount recesses 41. The mounts 70 are thus inclined with respect to the width of the body 12 so that inward facing ends of the mounts 70 are located forward of outward facing ends of the mounts 70. In this example, the outward facing surfaces of the mount recesses 41 are located below the inward facing surfaces of the mount recesses 41. The mounts 70 are thus inclined with respect to the width of the body 12 so that the inward facing ends of the mounts 7 are located below the outward facing ends of the mounts 70.

The mounts 70 may be elongated along the length of the handle 32. When the small planing watercraft 10 can travel straight, the length of the handle 32 is along the width of the body 12. The mounts 70 elongated along the length of the handle 32 are not required to be the mounts 70 elongated precisely parallel to the length of the handle 32. For example, in a case where the orientation of the mounts 70 is closer to a direction of the length of the handle 32 than a direction of the width or a direction of the height of the handle 32, such as a case where the mounts 70 form an angle of less than 45° with respect to the length of the handle 32, it can be said that the mounts 70 are elongated along the length of the handle 32. The mounts 70 may form an angle of less than 30° with respect to the length of the handle 32, or may form an angle of less than 15° with respect to the length of the handle 32.

The mounts 70 are disposed below an upper surface of the handle 32. In this example, the upper surface of the handle 32 is a portion of the upper cover 42 covering the handlebar 38 from above. The above-mentioned mount recesses 41 are formed forward of and below the upper surface. The mounts 70 are supported in the mount recesses 41, and thus the mounts 70 are located below the upper surface of the handle 32.

In this example, the first front cushion 63*a* and the second front cushion 63*b* of the cushion 60 protrude above an upper surface of the upper cover 42. The mounts 70 are thus located below an uppermost portion of the cushion 60. The mounts 70 are thus hidden by the cushion 60 as viewed from the operator.

The mounts 70 are supported by the handle cover 40. In this example, the mounts 70 and the handle cover 40 are integrated with each other as a single piece. For example, all or part of the handle cover 40 and the mounts 70 are integrally molded using the same resin material. That is to say, the mounts 70 are portions disposed to be spaced forward from the handle cover 40.

In this example, the handle cover 40 includes the upper cover 42 and the lower cover 50. The mounts 70 extend along the lower boundary 40L between the upper cover 42 and the lower cover 50 at a location forward of the lower boundary 40L. The mounts 70 each include an upper divided rod part 70U and a lower divided rod part 70L having been divided in a plane along the length of the handle 32. The plane in which the upper divided rod part 70U and the lower divided rod part 70L are divided is a plane passing through the lower boundary 40L, and extending along the length of the handle 32.

The upper cover 42 and the upper divided rod part 70U are integrally molded. That is to say, the upper cover 42 and the upper divided rod part 70U are integrally molded using the same resin material. The lower cover 50 and the lower divided rod part 70L are integrally molded. That is to say, the lower cover 50 and the lower divided rod part 70L are integrally molded using the same resin material.

The upper cover 42 and the lower cover 50 are joined together by a screwing or fitting structure, for example, and cover at least portion of the handlebar 38. In this state, the upper divided rod part 70U and the lower divided rod part 70L are joined together to form the rod-shaped mount 70.

The mounts 70 may be in the form of solid rods or hollow pipes, for example. An outer peripheral surface of each of the mounts 70 may have a shape of an outer peripheral surface of a cylinder or a prism, for example. In this example, the outer peripheral surface of each of the mounts 70 has the shape of the outer peripheral surface of the cylinder.

The mounts 70 each have a substantially circular cross-sectional shape perpendicular to the length of the mount 70. The substantially circular cross-sectional shape includes a shape that is circular to the extent that the additional part attached to the mount 70 can rotate around the mount 70, for example, and includes not only a geometrically circular shape but also a distorted circular shape and an elliptical shape, for example. The outer peripheral surface of each of the mounts 70 includes a protrusion and/or a recess (see FIG. 5).

In this example, each of the mounts 70 is cylindrical, and includes a groove 70g as the recess in the outer peripheral surface thereof. The groove 70g extends along the length of the mount 70, for example. The mount 70 may have grooves 70g. In this case, the grooves 70g may be formed at intervals along the circumference of the mount 70. Portions of the circumference of the mount 70 other than the grooves 70g can be grasped as protrusions. The outer peripheral surface of the mount 70 may include an elongated protrusion in place of the above-mentioned groove 70g. When the outer peripheral surface of the mount 70 includes a groove or an elongated protrusion along the length of the mount 7, the additional part attached to the mount 70 is less likely to rotate.

The protrusion or the recess of the mount 70 is not required to be the elongated protrusion or the groove. The protrusion or the recess of the mount 70 may be an elongated protrusion or a groove along the circumference of the mount 70 formed in place of or in addition to the elongated protrusion or the groove along the length of the mount 70. When the mount 70 has the elongated protrusion or the groove along the circumference of the mount 70, the additional part attached to the mount 70 is less likely to move along the length of the mount 70.

The mounts 70 may each be a round bar. In this case, the mounts 70 may each have a circular cross-sectional shape perpendicular to the length of the mount 70, and have a diameter of 15 mm or more and 25 mm or less. The mounts 70 may each have a circular cross-sectional shape perpendicular to the length of the mount 70, and have a diameter of 18 mm or more and 22.5 mm or less.

As illustrated in FIG. 4, the additional part 80 is attached to each of the mounts 70 as described below, for example. That is to say, the additional part 80 includes an attachment portion 82. The attachment portion 82 includes a base 83 and a U-shaped portion 84. The base 83 is an elongated member that is longer than the diameter of the mount 70. The base 83 has insertion holes at opposite ends thereof. The U-shaped portion 84 includes a semicircular portion and a pair of threaded portions extending from opposite ends of the semicircular portion in parallel and in the same direction. Outer peripheral surfaces of the threaded portions include threads. The threaded portions are inserted into the insertion holes at the opposite ends of the base 83 with the mount 70 being disposed within the U-shaped portion 84. Nuts 85 are threaded onto the threaded portions protruding from the insertion holes. The threaded portions are tightened with the nuts 85, so that the mount 70 is sandwiched between the U-shaped portion 84 and the base 83 to thus attach the attachment portion 82 to the mount 70.

The mounts 70 are each separated from the front surface of the handle 32, and thus a structure to sandwich the mount 70 in the fore-aft direction can be used as the attachment portion 82. For example, the attachment portion 82 is attached to the mount 70 by the U-shaped portion 84 itself sandwiching the mount 70 in the fore-aft direction or by the base 83 and the U-shaped portion 84 sandwiching the mount 70 in the fore-aft direction. The attachment portion 82 can thus firmly be secured to the mount 70.

The additional part 80 may be attached to the mount 70 by another configuration. For example, the additional part 80 may be attached to the mount 70 by a sandwiching structure utilizing a spring, such as a clothespin.

Rear Mount

Figure 7:
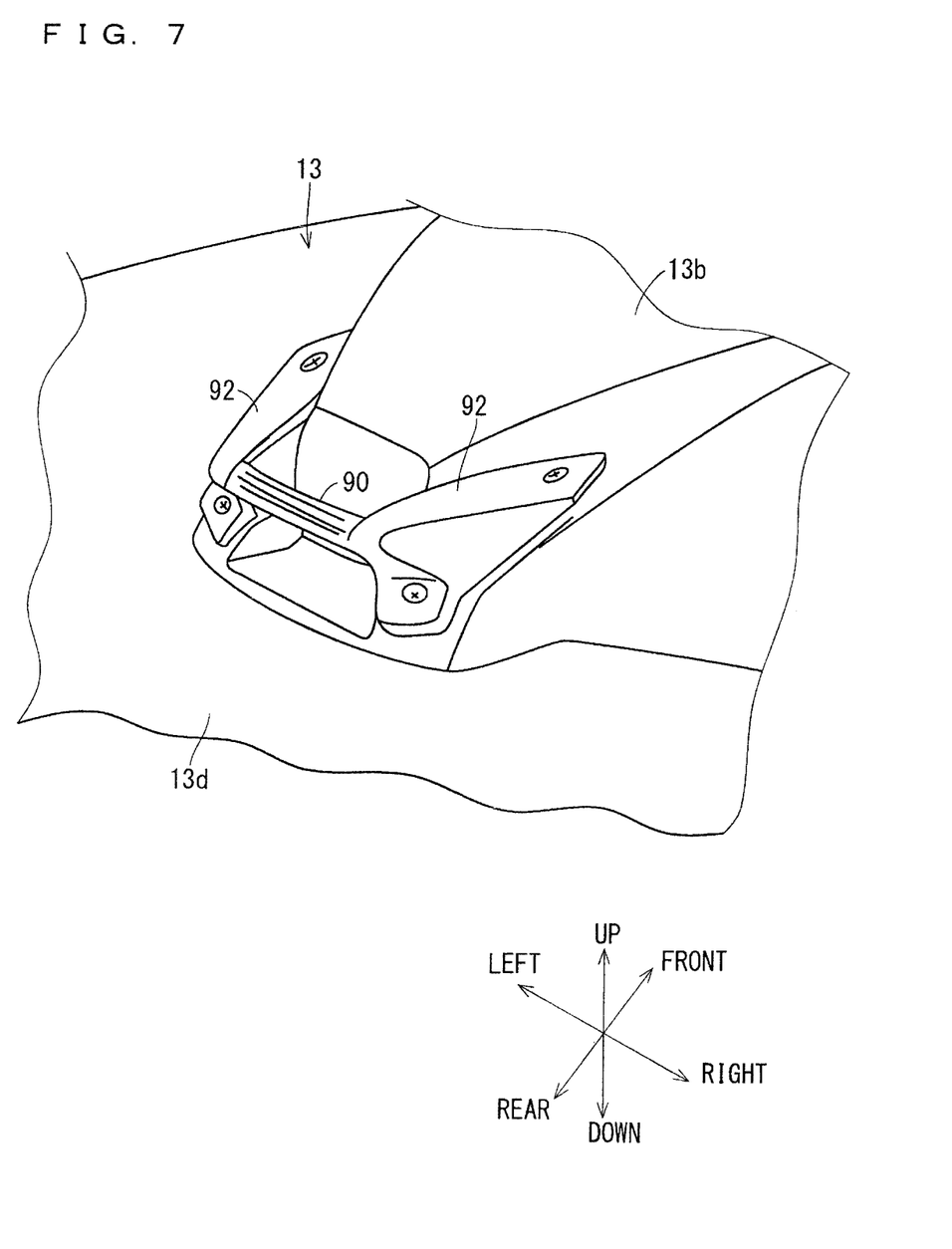
FIG. 7 is a perspective view illustrating a rear mount.

As illustrated in FIGS. 1 and 7, the small planing watercraft 10 may include a rear mount 90 behind the seat 18. The rear mount 90 has substantially the same cross-sectional shape as the mount 70. When the mount 70 has a circular cross-sectional shape, for example, the rear mount 90 also has a circular cross-sectional shape.

In an example illustrated in FIG. 7, opposite ends of the rear mount 90 are supported by a pair of rear attachment portions 92. The pair of rear attachment portions 92 is attached to a lower portion at the rear end of the central protrusion 13b. For example, the pair of rear attachment portions 92 is attached to the central protrusion 13b by screwing.

The rear attachment portions 92 and the rear mount 90 may integrally be molded. For example, the rear attachment portions 92 and the rear mount 90 may be molded using the same resin. The rear mount 90 protrudes from ends of the rear attachment portions 92 to intersect with the length of the rear attachment portions 92. The rear attachment portions 92 are attached to the lower portion at the rear end of the central protrusion 13b, and thus the rear mount 90 is supported at a location separated from a rearward facing surface of the central protrusion 13b. The additional part 80 can thus be attached to the rear mount 90 as in a case where the additional part 80 is attached to the mount 70.

The rear mount 90 and the rear attachment portions 92 may not necessarily integrally be molded. For example, the ends of the rear mount 90 may be attached to the rear attachment portions 92 by a fitting or screwing structure.

According to the small planing watercraft 10, the additional part 80 attached to each of the mounts 70 is disposed near the handle 32. The additional part 80 is thus disposed closer to the operator compared with a case where the mount is provided to the deck 13. The additional part 80 is angularly displaced together with the handle 32, so that the additional part 80 is disposed in a position responsive to a heading direction of the body 12. The operator thus easily operates and views the additional part 80 or a part supported by the additional part 80 during travel of the small planing watercraft 10. The additional part 80 is disposed forward of the handle 32, so that contact of the operator with the additional part 80 can be prevented, and reduction in steering operability can be suppressed when the operator performs steering operation. Configurations described below are not necessarily required to obtain the effects.

The mounts 70 are disposed to be spaced forward from the front surface of the handle 32. The additional part 80 can thus be held by each of the mounts 70 using a securing structure to sandwich the mount 70 at least in the fore-aft direction. Acceleration in the fore-aft direction by an increase or a decrease in speed of the small planing watercraft 10 can thus effectively be received by the securing structure, and the strength of securement of the additional part 80 with respect to acceleration in the fore-aft direction is increased. An intermediate portion of each of the mounts 70 along the length thereof is separated from the handle cover 40, and thus the additional part 80 can easily be attached to the mount 70 using a gap between the mount 70 and the handle cover 40.

The handle 32 includes the pair of handle grips 34 at the opposite longitudinal ends thereof, and the mounts 70 are elongated along the width of the body 12. A location of attachment of the additional part 80 is thus easily adjusted along the width of the body 12.

The mounts 70 are elongated along the length of the handle 32. The location of attachment of the additional part 80 is thus easily adjusted along the length of the handle 32. An amount by which the mounts 70 protrude forward from the handle 32 can be suppressed to prevent an increase in size of the mounts 70.

When the mounts 70 are disposed below the upper surface of the handle 32, the mounts 70 are likely to be protected by a portion of the handle 32 located above the mounts 70. A structure to attach the additional part 80 to each of the mounts 70 is also protected.

The mounts 70 are disposed inward, along the width of the body 12, of the inner ends of the handle grips 34, and thus the additional part 80 is attached at a location closer to the center along the width of the body 12 than the handle grips 34 are. Interference of any fingers with the additional part 80 can thus be prevented, and smooth operation of the handle grips 34 can be maintained when the handle grips 34 are operated.

The mounts 70 are supported by the handle cover 40, and thus a configuration to support the mounts 70 can easily be achieved.

When the handle cover 40 and the mounts 70 are integrated with each other as a single piece, the number of parts can be reduced compared with a case where the handle cover 40 and the mounts 70 are separated pieces.

The handle cover 40 includes the upper cover 42 and the lower cover 50, each of the mounts 70 includes the upper divided rod part 70U and the lower divided rod part 70L, the upper cover 42 and the upper divided rod part 70U are integrally molded, and the lower cover 50 and the lower divided rod part 70L are integrally molded. When the upper divided rod part 70U and the lower divided rod part 70L are joined together with the upper cover 42 and the lower cover 50 being joined together, the mounts 70 and the handle cover 40 are easily formed together without using a complicated mold, such as a slide mold. The mounts 70 are easily hollowed.

As for the forward facing surface 41F of the handle cover 40 opposing each of the mounts 70, the upper edge 41F*b* of the forward facing surface 41F is located rearward of the portion 41F*a* of the forward facing surface 41F located rearward of the mount 70. A space expanding rearward as it expands upward is thus likely to be formed behind each of the mounts 70. The additional part 80 attached to each of the mounts 70 can thus be disposed to be inclined rearward as it extends upward. An upper portion of the additional part 80 is thus likely to be disposed closer to the operator.

The small planing watercraft 10 includes the key insertion opening 31 disposed forward of the rear end of the cushion 60. The key 31K inserted into the key insertion opening 31 is likely to be disposed forward of the rear end of the cushion 60, so that interference with the key 31K can be prevented in steering operation. The effect of the cushion 60 is obtained also in another configuration, such as a configuration without the mounts 70.

Each of the mounts 70 has a substantially circular cross-sectional shape perpendicular to the length thereof. The outer peripheral surface of each of the mounts 70 includes the protrusion and/or the recess, such as the groove 70*g*. The attachment portion 82 of the additional part 80 is thus less likely to move in a direction in which the attachment portion 82 is caught by the protrusion and/or the recess, and thus the additional part 80 is likely to be maintained at a fixed location.

When each of the mounts 70 is the round bar having a circular cross-sectional shape perpendicular to the length of the mount 70 and having a diameter of 15 mm or more and 25 mm or less, the mount 70 is easily formed to have a size similar to the size of a typical pipe for a handle. The additional part 80 is thus easily secured to the mount 70 by the sandwiching structure and the like. When the mount 70 has a diameter of 18 mm or more and 22.5 mm or less, for example, a structure to attach the additional part to a round bar having a diameter of 18 mm or more and 22.5 mm or less can be used.

The rear mount 90 having substantially the same shape as each of the mounts 70 is located rearward of the seat 18, so that portions around the handle 32 and behind the seat 18 can have the structure to attach the additional part 80 in common, and design of the structure is easy.

MODIFICATIONS

An example in which the mounts 70 are disposed to be separated forward from the handle cover 40 has been described in the present embodiment. The mounts 70, however, may be disposed to be separated upward or downward from the handle cover, or may not necessarily be disposed to be separated from the handle cover.

An example in which the mounts 70 are supported in the mount recesses 41 formed in the handle cover 40 has been described in the present embodiment. A configuration to support the mounts 70 is not limited to the configuration. For example, a pair of partial protrusions may be formed on the handle cover, and opposite ends of each of the mounts may be supported by the pair of protrusions so that the intermediate portion of the mount along the length thereof is separated from the handle cover. Furthermore, the mount may have a U shape, and the opposite ends of the mount having the U shape may be supported by the handle cover so that the intermediate portion of the mount are disposed to be separated from the handle cover.

An example in which the mounts 70 extend along the width of the body 12 or the length of the handle 32 has been described in the present embodiment. A position of the mounts 70 is not particularly limited. For example, the mounts may each be in a position along the vertical direction or the fore-aft direction.

An example in which the mounts 70 and the handle cover 40 are integrally formed has been described in the present embodiment. The mounts, however, may be formed separately from the handle cover, and attached to the handle cover. For example, the mounts may be attached to the handle cover by fitting the ends of each of the mounts into the handle cover or by screwing the ends of each of the mounts to the handle cover.

An example in which the mounts 70 are supported by the handle cover 40 has been described in the present embodiment. The mounts 70, however, may not necessarily be supported by the handle cover 40, and the mounts 70 may directly or indirectly be screwed or welded to the handlebar 38, for example.

The present application discloses the following aspects.

A small planing watercraft according to the first aspect includes: a body; a seat located above the body; a steering handle located above the body and forward of the seat; and an additional part holding mount secured to the handle and disposed forward of a rear surface of the handle.

According to the small planing watercraft, an additional part attached to the mount is disposed near the handle. The additional part can be disposed closer to an operator compared with a case where the mount is provided to the deck. The additional part is angularly displaced together with the handle, so that the additional part can be disposed in a position responsive to a heading direction of the body. The additional part is disposed forward of the handle, so that contact of the operator with the additional part can be prevented, and reduction in steering operability can be suppressed when the operator performs steering operation.

As in the second aspect, the mount may be disposed to be spaced forward from a front surface of the handle. In this case, the additional part can be held by the mount using a securing structure to sandwich the mount at least in a fore-aft direction, and thus the strength of securement with respect to acceleration in the fore-aft direction can be increased.

As in the third aspect, the handle may include, at opposite longitudinal ends thereof, a pair of handle grips to be grasped by an operator, and the mount may be elongated along a width of the body. In this case, a location of attachment of the additional part is easily adjusted along the width of the body.

As in the fourth aspect, the handle may include, at the opposite longitudinal ends thereof, the pair of handle grips to be grasped by the operator, and the mount may be elongated along a length of the handle. An amount by which the mount protrudes forward from the handle can thus be suppressed to prevent an increase in size of the mount.

As in the fifth aspect, the mount may be disposed below an upper surface of the handle. The mount is likely to be protected by the upper surface of the handle.

As in the sixth aspect, the handle may include, at the opposite longitudinal ends thereof, the pair of handle grips to be grasped by the operator, and the mount may be disposed inward, along the width of the body, of inner ends of the handle grips along the width of the body. In this case, the additional part is disposed at a location shifted closer to the center along the width of the body than the pair of handle grips is, and thus interference of any fingers with the additional part can be prevented, and smooth operation of the handle grips can be maintained when the handle grips are operated.

As in the seventh aspect, the handle may include the pair of handle grips to be grasped by the operator at the opposite longitudinal ends thereof, a handlebar extending toward the center along the width of the body to be contiguous with the pair of handle grips, and the handle cover covering at least portion of the handlebar from in front, and the mount may be supported by the handle cover. A configuration to support the mount can thus easily be achieved.

As in the eighth aspect, the handle cover and the mount may be integrated with each other as a single piece. In this case, the number of parts can be reduced compared with a case where the mount and the handle cover are formed as separated pieces.

As in the ninth aspect, the mount may be a portion disposed to be spaced forward from the handle cover, the handle cover may include an upper cover and a lower cover, the mount may include an upper divided rod part and a lower divided rod part having been divided in a plane along the length of the handle, the upper cover and the upper divided rod part may integrally be molded, the lower cover and the lower divided rod part may integrally be molded, and the upper divided rod part and the lower divided rod part may be joined together with the upper cover and the lower cover being joined together. The mount is thus easily formed by the handle cover without using a complicated mold, such as a slide mold.

As in the tenth aspect, the handle may include the pair of handle grips to be grasped by the operator at the opposite longitudinal ends thereof, the handlebar extending toward the center along the width of the body to be contiguous with the pair of handle grips, and the handle cover covering at least portion of the handlebar from in front, the handle cover may include an opposing portion extending upward from behind the mount, and an upper edge of the opposing portion is located rearward, in the fore-aft direction of the body, of a portion of the opposing portion located rearward of the mount. In this case, a space expanding rearward as it expands upward is likely to be formed in a space behind the mount. The additional part attached to the mount can thus be disposed to be inclined rearward as it extends upward. The additional part is thus likely to be disposed closer to the operator.

As in the eleventh aspect, the handle may include the pair of handle grips to be grasped by the operator at the opposite longitudinal ends thereof, the handlebar supporting the pair of handle grips, and a cushion covering at least portion of the handlebar from behind, and the small planing watercraft may further include a key insertion opening disposed forward of a rear end of the cushion. In this case, a key inserted into the key insertion opening is likely to be disposed forward of the rear end of the cushion, so that interference with the key can be prevented in operation. A synergy effect with the effect obtained in the first aspect can be expected on operation.

As in the twelfth aspect, the mount may have a substantially circular cross-sectional shape perpendicular to a length of the mount, and an outer peripheral surface of the mount may include a protrusion and/or a recess. In this case, the additional part attached to the mount is less likely to move along the mount.

As in the thirteenth aspect, the mount may be a round bar having a circular cross-sectional shape perpendicular to the length of the mount and having a diameter of 15 mm or more and 25 mm or less. In this case, the mount is easily formed to have a size similar to the size of a typical handle pipe, and the additional part is easily secured by sandwiching.

As in the fourteenth aspect, a rear mount located rearward of the seat, and having substantially the same cross-sectional shape as the mount may further be included. The rear mount and the mount are formed to have substantially the same cross-sectional shape as described above, so that a common securing structure can be used, and design of parts can be simplified.

A small planing watercraft according to the fifteenth aspect includes: the body; the seat located above the body; the handle located above the body and forward of the seat, the handle including a first handle grip located to the left of the center in a left-right direction of the body and a second handle grip located to the right of the center in the left-right direction of the body; and a rod supported by the handle, and located forward of the first handle grip and the second handle grip.

According to the small planing watercraft, the additional part attached to the rod is disposed near the handle. The additional part can be disposed closer to the operator compared with a case where the rod is provided to the deck. The additional part is angularly displaced together with the handle, so that the additional part can be disposed in the position responsive to the heading direction of the body. The additional part is disposed forward of the handle, so that contact of the operator with the additional part can be prevented, and reduction in steering operability can be suppressed when the operator performs steering operation.

As in the sixteenth aspect, the rod may be disposed below an upper surface of the handle, and may be disposed to be spaced forward from the front surface of the handle. The additional part can thus be held by the rod using the securing structure to sandwich the rod at least in the fore-aft direction, and thus the strength of securement with respect to acceleration in the fore-aft direction can be increased. The upper surface of the handle is disposed above the rod, and thus the rod is likely to be protected by the upper surface of the handle.

A small planing watercraft according to the seventeenth aspect includes: the body; the seat located above the body; the steering handle located above the body and forward of the seat, the handle including the pair of handle grips to be grasped by the operator at the opposite longitudinal ends thereof, the handlebar supporting the pair of handle grips, and the cushion covering at least portion of the handlebar from behind; and the key insertion opening disposed forward of the rear end of the cushion.

According to the small planing watercraft, the key inserted into the key insertion opening is likely to be protected by the cushion.

As in the eighteenth aspect, the cushion may include a first rear cushion and a second rear cushion located to be spaced from each other in the left-right direction, and the key insertion opening may be located between the first rear cushion and the second rear cushion. The key inserted into the key insertion opening is thus disposed between the first rear cushion and the second rear cushion, so that the key is protected.

The foregoing description is in all aspects illustrative and not restrictive. It is therefore understood that numerous unillustrated modifications can be devised without departing from the scope of the disclosure.

What is claimed is:

1. A personal watercraft comprising:
    a body;
    a seat located above the body;
    a steering handle located above the body and forward of the seat; and
    an additional part holding mount secured to the handle and disposed forward of a rear surface of the handle; and
    wherein the additional part holding mount comprises a rod shaped bar elongated along a length of the handle; and
    wherein the handle includes a pair of handle grips to be grasped by an operator at opposite longitudinal ends thereof, a handlebar extending toward a center along a width of the body to be contiguous with the pair of handle grips, and a handle cover covering at least portion of the handlebar from in front, and the mount is supported by the handle cover.

2. The personal watercraft according to claim 1, wherein the mount is disposed left or right away from a center in a left-right direction of the body.

3. The personal watercraft according to claim 1, wherein the mount is disposed at each of a right side and a left side from a center in a left-right direction of the body.

4. The personal watercraft according to claim 1, wherein the handle includes, at opposite longitudinal ends thereof, a pair of handle grips to be grasped by an operator, and the mount is elongated along a length of the handle at an angle of less than 45° with respect to the length of the handle.

5. The personal watercraft according to claim 1, wherein the mount is disposed below an upper surface of the handle.

6. The personal watercraft according to claim 1, wherein the handle includes, at opposite longitudinal ends thereof, a pair of handle grips to be grasped by an operator, and the mount is disposed inward, along a width of the body, of inner ends of the handle grips along the width of the body.

7. The personal watercraft according to claim 1, wherein the handle cover and the mount are integrated with each other as a single piece.

8. The personal watercraft according to claim 7, wherein the mount is a portion disposed to be spaced forward from the handle cover,
    the handle cover includes an upper cover and a lower cover,
    the mount includes an upper divided rod part and a lower divided rod part having been divided in a plane along a length of the handle,
    the upper cover and the upper divided rod part are integrally molded,
    the lower cover and the lower divided rod part are integrally molded, and
    the upper divided rod part and the lower divided rod part are joined together with the upper cover and the lower cover being joined together.

9. The personal watercraft according to claim 1, wherein the handle includes a pair of handle grips to be grasped by an operator at opposite longitudinal ends thereof, a handlebar extending toward a center along a width of the body to be contiguous with the pair of handle grips, and a handle cover covering at least portion of the handlebar from in front,
    the handle cover includes an opposing portion extending upward from behind the mount, and
    an upper edge of the opposing portion is located rearward, in a fore-aft direction of the body, of a portion of the opposing portion located rearward of the mount.

10. The personal watercraft according to claim 1, wherein the handle includes a pair of handle grips to be grasped by an operator at opposite longitudinal ends thereof, a handlebar supporting the pair of handle grips, and a cushion covering at least portion of the handlebar from behind, and
    the personal watercraft further includes a key insertion opening disposed forward of a rear end of the cushion.

11. The personal watercraft according to claim 1 wherein the handle includes a first handle grip located to the left of a center in a left-right direction of the body and a second handle grip located to the right of the center in the left-right direction of the body; and
    the mount includes a rod supported by the handle, and located forward of the first handle grip and the second handle grip.

12. The personal watercraft according to claim 11, wherein
    the rod is disposed below an upper surface of the handle, and is disposed to be spaced forward from a front surface of the handle.

13. The personal watercraft according to claim 1, wherein the cushion includes a first rear cushion and a second rear cushion located to be spaced from each other in a left-right direction, and the key insertion opening is located between the first rear cushion and the second rear cushion.

14. The personal watercraft according to claim 1, wherein the handle includes a handle cover, the mount includes an elongated portion, both ends of the elongated portion being supported by the handle cover, and the elongated portion is disposed to be spaced forward from the handle cover.

15. A personal watercraft comprising:

a body;

a seat located above the body;

a steering handle located above the body and forward of the seat; and an additional part holding mount secured to the handle and disposed forward of a rear surface of the handle, wherein the mount is a round bar having a circular cross-sectional shape perpendicular to a length of the mount and having a diameter of 15 mm or more and 25 mm or less.

16. A personal watercraft comprising:

a body;

a seat located above the body;

a steering handle located above the body and forward of the seat; and an additional part holding mount secured to the handle and disposed forward of a rear surface of the handle; and a rear mount located rearward of the seat, and having substantially the same cross-sectional shape as the mount; and wherein the additional part holding mount comprises a rod shaped bar elongated along a length of the handle.

17. A personal watercraft comprising:

a body;

a seat located above the body;

a steering handle located above the body and forward of the seat; and an additional part holding mount secured to the handle and disposed forward of a rear surface of the handle; and wherein the additional part holding mount comprises a rod shaped bar elongated along a length of the handle; and wherein the rod shaped bar has a geometrically circular, a distorted circular, or an elliptical cross-sectional shape.

18. The personal watercraft according to claim 17, wherein the mount has a substantially circular cross-sectional shape perpendicular to a length of the mount, and an outer peripheral surface of the mount includes a protrusion and/or a recess.

19. A personal watercraft comprising:

a body;

a seat located above the body;

a steering handle located above the body and forward of the seat; and an additional part holding mount secured to the handle and disposed forward of a rear surface of the handle; and wherein the additional part holding mount comprises a rod shaped bar elongated along a length of the handle; and wherein the mount is disposed at each of a right side and a left side from a center in a left-right direction of the body, and the handle includes, at opposite longitudinal ends thereof, a pair of handle grips to be grasped by an operator and a pair of mount recesses located to be separated toward a center along a width of the body from the pair of handle grips.

* * * * *